(12) United States Patent
Obenshain

(10) Patent No.: US 6,573,856 B1
(45) Date of Patent: Jun. 3, 2003

(54) METHOD OF SYNTHESIZING TOPOGRAPHIC DATA

(75) Inventor: Kenneth Fell Obenshain, Masassas, VA (US)

(73) Assignee: Lockheed Martin Corporation, Goodyear, AZ (US)

(*) Notice: Subject to any disclaimer, the term of this patent is extended or adjusted under 35 U.S.C. 154(b) by 0 days.

(21) Appl. No.: 10/037,575

(22) Filed: Jan. 3, 2002

(51) Int. Cl.[7] .............................................. G01S 13/00
(52) U.S. Cl. .................................................... 342/25
(58) Field of Search ........................... 342/25, 190, 191, 342/194, 195

(56) References Cited

U.S. PATENT DOCUMENTS

| | | | |
|---|---|---|---|
| 3,727,219 A | 4/1973 | Graham | 343/5 |
| 4,359,732 A | 11/1982 | Martin | 343/5 |
| 4,551,724 A | 11/1985 | Goldstein et al. | 343/5 |
| 4,975,704 A | 12/1990 | Gabriel et al. | 342/25 |
| 5,170,171 A | 12/1992 | Brown | 342/191 |
| 5,260,708 A | 11/1993 | Auterman | 342/25 |
| 5,332,999 A | 7/1994 | Prati et al. | 342/25 |
| 5,394,151 A | 2/1995 | Knaell et al. | 342/25 |
| 5,463,397 A | 10/1995 | Frankot | 342/25 |
| 5,489,907 A | 2/1996 | Zink et al. | 342/25 |
| 5,659,318 A | 8/1997 | Madsen et al. | 342/25 |
| 5,673,050 A * | 9/1997 | Moussally et al. | 342/22 |
| 5,677,693 A | 10/1997 | Frankot et al. | 342/25 |
| 5,774,089 A | 6/1998 | Bamler et al. | 342/25 |
| 5,835,055 A * | 11/1998 | van der Kooij | 342/162 |
| 5,945,937 A * | 8/1999 | Fujimura | 342/162 |
| 6,037,892 A * | 3/2000 | Nikias et al. | 342/159 |
| 6,088,295 A * | 7/2000 | Altes | 342/179 |
| 6,150,972 A * | 11/2000 | Bickel et al. | 342/190 |
| 6,204,799 B1 * | 3/2001 | Caputi, Jr. | 342/162 |

OTHER PUBLICATIONS

Author: Leroy C. Graham, Title: Synthetic Interferometer Radar for Topographic Mapping Date: Jun. 6, 1974, Pages: Six (6) Pages.

* cited by examiner

Primary Examiner—Thomas H. Tarcza
Assistant Examiner—Brian Andrea
(74) Attorney, Agent, or Firm—Lowell W. Gresham; Jordan M. Meschkow; Charlene R. Jacobsen

(57) ABSTRACT

Synthetic aperture radar (SAR) data (118) of a target (108) is collected (12) over a substantially circular arc (128), wherein a.chord (130) of the arc (128) establishes (20) a radar aperture (102) having a substantially perpendicular construct baseline (104) through the target (108). The radar aperture (102) is partitioned (26) into first and second partial apertures (120) having substantially the construct baseline (104). First and second points (150) substantially vertically coincident with the construct baseline (104) are then determined (38) at means (152) of the first and second partial apertures (120), and first and second vectors (106) from the target (108) are established (40) by the first and second points (150), respectively. First and second portions (148) of the SAR data (118) are accumulated (32) over the first and second partial apertures (120), respectively, and first and second vector complex image data (164) of the target (108) is derived (54) in response thereto. The first and second vector complex image data (164) is then interferogrammetrically integrated (80) and the topographic data (116) of the target (108) is produced (14) thereby.

24 Claims, 4 Drawing Sheets

METHOD OF SYNTHESIZING TOPOGRAPHIC DATA

TECHNICAL FIELD OF THE INVENTION

The present invention relates to the field of topographic radar data synthesis. More specifically, the present invention relates to the field of synthesizing topographic data from synthetic aperture radar data.

BACKGROUND OF THE INVENTION

There exists a need for topographic (i.e., three-dimensional) data using conventional synthetic aperture radar (SAR) data-gathering techniques. The need for accurate topographic data is demonstrated within the mapping, charting, geodesy, and intelligence communities, among others. Techniques have been developed to obtain topographic information from SAR data. However, such techniques suffer from one or more problems.

One approach to obtaining topographic information from SAR data is the single-pass, two-antenna technique. In this technique, a single SAR system uses two antennas to obtain two images in a single pass. The two antennas point in substantially the same direction but with differing vectors to a target in a vertical plane. The two antennas are therefore able to obtain two complex images that are substantially identical except for phase. For a given pixel, therefore, phase difference between the two complex images is a function of the height of the target above a reference plane at the location of that pixel. Thus, each phase difference can be converted into a target height. This is as taught by Graham, U.S. Pat. No. 3,727,219.

A significant problem exists with the single-pass, two-antenna technique. Generally, the greater the angular separation between the two vectors, the better the resolution of the resultant topographic data. It is therefore desirable that the two antennas be separated by as great an angular distance as possible. In an aircraft, for example, this may be accomplished by the two antennas being either vertically separated (e.g., mounted above and below the fuselage) or horizontally separated (e.g., mounted proximate the wing tips). Since both antennas are mounted to the same aircraft, the angular displacement between the antennas is constrained by the physical limitations of the aircraft.

Additionally, the single-pass, two-antenna technique requires an SAR system with two antennas and attendant electronics. Even when a majority of components are shared, this represents a significant increase in complexity over a single-antenna (i.e., conventional) SAR system. This increase in complexity incurs a corresponding increase in procurement and operational costs.

Another approach to obtaining topographic information from SAR data is the dual-pass, single-antenna technique. In this technique, a conventional single-antenna SAR system obtains one image in each of two passes. Each pass is made so the single antenna points in substantially the same direction but with differing vectors to the target in the vertical plane. The single antenna is therefore able to obtain two complex images that are substantially identical except for phase. As above, the pixel-by-pixel phase differences between the two complex images can be converted into target heights.

A significant problem exists with the dual-pass, single-antenna technique. Accuracy is dependent upon the two passes being substantially identical except for angular separation between the two vectors. That is, the two paths should ideally be parallel in both space and time. This would require a pilot and aircraft, both of which are capable of flying truly parallel courses at exactly identical velocities. Such pilots and aircraft do not exist in the real world. The accuracy obtainable with the dual-pass, single-antenna technique is therefore limited by the accuracy of the two paths.

Additionally, because the real world presents an ever-changing scenario, both passes of the dual-pass, single-antenna technique should ideally be simultaneous. To effect simultaneous passes, two aircraft, each encompassing a conventional single-antenna SAR system, are used. This significantly increases the overall complexity, and incurs a corresponding increase in costs.

To minimize costs, a single aircraft with a single SAR system is normally used to effect both passes. The accuracy of the resultant data is therefore additionally affected by the time between the two passes.

A third approach to obtaining topographical information from SAR data is the single-pass, autofocus-tracking technique. In this technique, a conventional single-antenna SAR system collects SAR phase history data while negotiating an arc in three-dimensional space. This approach results in radar scatters not in the SAR around plane being defocused. A spatially variant autofocus may be used to extract the parabolic phase needed to properly focus the SAR imagery. This parabolic phase can be scaled into a height above and below the ground focus plane.

A problem exists with the single-pass, autofocus-tracking technique in that other sources of parabolic chase shift may produce significant errors in the determined target heights. These parabolic phase shifts must therefore be eliminated and/or compensated for. This typically requires an increase in circuit complexity, with an attendant increase in costs.

Also, the single-pass, autofocus-tracking technique requires a large number of pixels of SAR data to extract a single parabolic phase measurement. To achieve meaningful topographic data, a large number of parabolic phase measurements must be made and the results averaged to reduce the variance of the measurement error. The result is that, for a given amount of SAR data, only a relatively few topographic data may be produced. This results in a coarse topographic image for a fine SAR image.

What is needed, therefore, is a method of producing topographic data from SAR data while maintaining the data resolution and using only conventional (i.e., single-antenna) SAR systems in a single pass.

SUMMARY OF THE INVENTION

Accordingly, it is an advantage of the present invention that a method of synthesizing topographic data is provided.

It is another advantage of the present invention that a method of synthesizing topographic data is provided that collects synthetic aperture radar data in a single pass over an arcuate data collection path transiting a single radar aperture having a construct baseline to a target.

It is another advantage of the present invention that a method of synthesizing topographic data is provided that partitions a radar aperture into a plurality of partial radar apertures each having a construct baseline substantially coincident with a construct baseline of the radar aperture.

It is another advantage of the present invention that a method of synthesizing topographic data is provided that processes synthetic aperture radar data collected over each of a plurality of partial radar apertures into complex image data containing Interferogrametric properties.

It is another advantage of the present Invention that a method of synthesizing topographc data is provided that integrates irterferogrametric complex image data into topographic data.

The above and other advantages of the present invention are carried out in one form by a method for synthesizing topographic data of a target. The method incorporates collecting synthetic aperture radar (SAR) data of the target, generating full-aperture complex image data of the target from the SAR data, generating first partial-aperture complex image data of the target from a first portion of the SAR data, and generating second partial-aperture complex image data of the target from a second portion of the SAR data. The method also incorporates deriving first-angle complex image data of the target in response to the first partial-aperture complex image data and the full-aperture complex image data, deriving second-angle complex image data of the target in response to the second partial-aperture complex image data and the full-aperture complex image data, and interferograrmmetrically integrating the first-angle complex image data and the second-angle complex image data to produce the topographic data of the target.

The above and other advantages of the present invention are carried cut in another form by a method for synthesizing topographic data of a target. The method includes transiting a radar aperture partitioned into first and second partial apertures, accumulating first and second portions of synthetic aperture radar (SAR) data over the first and second partial apertures, respectively, producing first-angle and second-angle complex image data of the target in response to the first and second portions of the SAR data, and interferogrammetrically integrating the first-angle and second-angle complex image data to produce the topographic data.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figures 1, 2, 3:
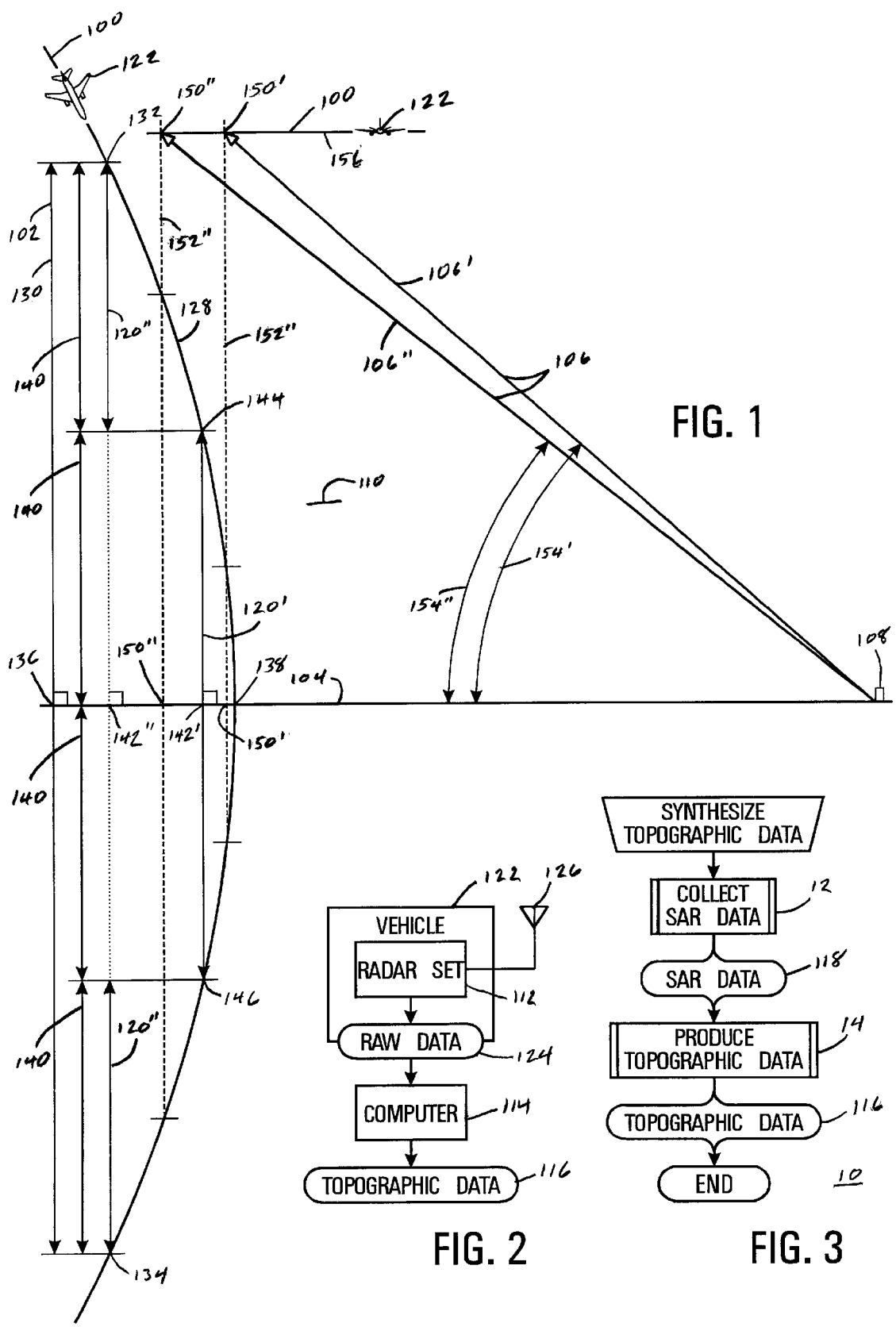
FIG. 1 shows a composite view depicting a plan view of data collection path depicting a radar aperture and a construct baseline, coupled with a side view of the data collection path depicting vectors to target in accordance with a preferred embodiment of the present invention.
FIG. 2 shows a block diagram depicting a radar set and a computer for collecting and processing data, respectively, in accordance with a preferred embodiment of the present invention.
FIG. 3 shows a flowchart depicting a method for synthesizing topographic data in accordance with a preferred embodiment of the present invention.
Figure 4:
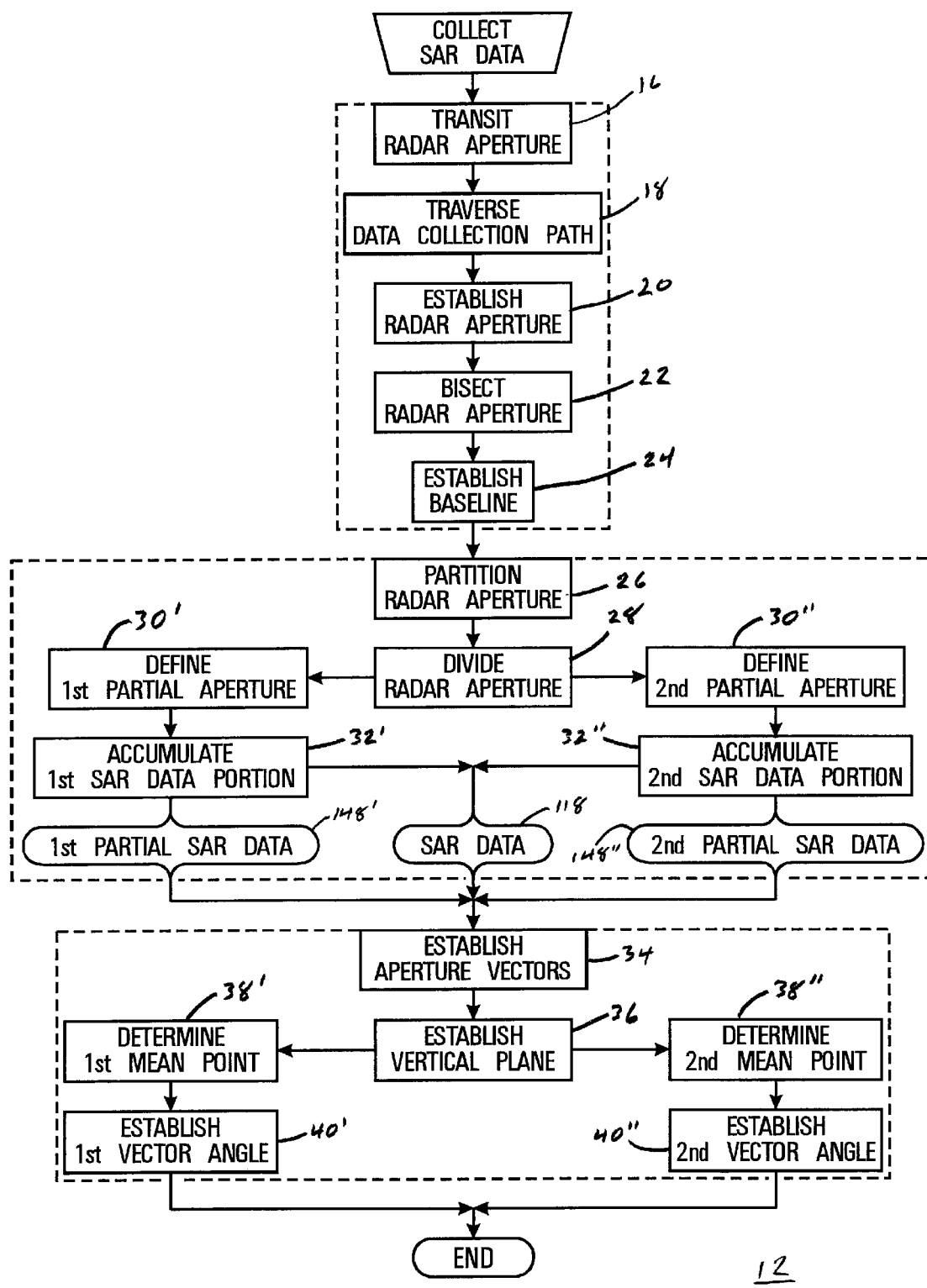
FIG. 4 shows a flowchart depicting a synthetic aperture radar data collection subprocess in accordance with a preferred embodiment of the present invention.

FIG. 1 shows a composite view depicting a plan view of a data collection path 100 depicting a radar aperture 102 and a construct baseline 104, coupled with a side view of the data collection path 100 depicting vectors 106 from,a target 108 in accordance with a preferred embodiment of the present invention. A vertical plane 110 encompassing construct baseline 104 is rotated 90° to lay flat upon FIG. 1 and depict vectors 106. FIG. 2 shows a block diagram depicting a radar set 112 and a computer 114 for collecting and processing data, respectively, in accordance with a preferred embodiment of the present invention. FIG. 3 shows a flowchart depicting a process 10 for synthesizing topographic data 116, and,FIG. 4 shows a flowchart depicting a subprocess 12 to collect synthetic aperture radar data 118 in accordance with a preferred embodiment of the present invention.

To ease understanding throughout this discussion, processes, subprocesses, and tasks have two-digit reference numbers (e.g., topographic data synthesization process 10), while other entities have three-digit reference numbers (e.g., target 108). Also, a plurality of tasks and other entities are differentiated, i.e., have a "first" version and a "second" version. Except where specifically indicated, as for exemplary purposes, the first and second versions are substantially interchangeable. For the purposes of simplicity, a given unaccented reference number refers to an undifferentiated task or entity (e.g., target 108), or to both the first and second versions of a differentiated task or entity (e.g., partial apertures 120. A prime reference number refers to a first version c a differentiated task or entity e.g., first partial aperture 120'). A double prime reference number refers to a second version of a differentiated task or entity (e.g, second partial aperture 120").

As depicted in FIGS. 1 and 2, an aircraft or other vehicle (e.g., a spacecraft) 122 traverses a data collection path (e.g., flight path) 100. Radar set 112 aboard aircraft 122 collects raw data 124 through a radar antenna 126. Raw data 124 is then passed through and processed by computer 114 to become topographic data 116. Those skilled in the art will appreciate that computer 114 may be located aboard aircraft 122 or not, as desired, without departing from the spirit of the present invention.

Additionally, it is not a requirement of the present invention that raw data 124 be immediately processed into topographical data 100, and that a delay in the passage of raw data 124 into computer 114 does not constitute a departure from the spirit of the present invention.

Also, the preferred embodiment depicts a broadside collection geometry. This is not a requirement of the present invention, and those skilled in the art will appreciate that other collection geometries, such as a squinted collection geometry, may be used without departing from the spirit of the present invention.

Topographic data synthesization process 10 (FIG. 3) incorporates subprocess 12 to collect synthetic aperture radar (SAR) data 118 and a subprocess 14 to produce topographic data 116 from SAR data 118.

In subprocess 12 (FIG. 4), in a primary task 16, aircraft 122 transits radar aperture 102. In the preferred embodiment FIG. 1, a task 18 is effected by the traversing of data collection path 100 in substantially an arc 128 by aircraft 122. Ideally, arc 128 is a substantially circular arc in substantially a horizontal plane. Those skilled in the art appreciate, however, arc 128 may be circular, elliptical, hyperbolic, parabolic, etc ., and may be executed, in a horizontal, vertical, or inclined plane without departing from the spirit of the present invention.

In a task 20, a chord 130 of arc 128 is established as radar aperture 102. That is, radar aperture 102 is a substantially straight-line aperture between a starting point 132 and an ending point 134 upon data collection path 100. This constitutes chord 130.

A task 22 substantially perpendicularly bisects chord 130 (i.e., radar aperture 102), and a task 24 establishes construct baseline 104 as the bisector of chord 130 passing through an arc 128 and through target 108. Chord 130 is perpendicularly bisected by construct baseline 104, i.e., construct baseline 104 substantially perpendicularly intersects chord 130 at a point 136 substantially midway between starting point 132 and ending point 134.

Construct baseline 104 intersects arc 128 at a base point 138. In the preferred embodiment arc 128 is a circular arc. Therefore, because construct baseline 104 is substantially perpendicular to chord 130 or arc 128, construct baseline 109 bisects arc 128 at a base point 138 that is the closest point upon arc 128 to target 108.

Another primary task 26 in subprocess 12 Partitions radar aperture 102 to form partial apertures 120. A task 28 divides radar aperture 102 (i.e., chord 130) into at least three sequential portions 140. A task 30' defines at least one of chord portions 140 (i.e., an inner port on 140) as a first partial aperture 120' having substantially construct baseline 104, an(a parallel ask 30" defines at least two of chord portions 140 (i.e., two cuter portions 140) as a second partial aperture 120" having substantially construct baseline 104. In other words, in the preferred embodiment, task 28 divides chord 130 into four substantially equal sequential portions 140. Task 30' then defines the two inner portions 140 as first partial aperture 120' and task 30" defines the two outer portions 140 as second partial aperture 120". Those skilled in the art will appreciate that other division schemes are possible and do not depart from the spirit of the present invention.

Partial apertures 120 have construct baseline 104. That is, partial apertures 120 substantially share construct baseline 104 with radar aperture 102. Construct baseline 104 is a bisecting line perpendicular to chord 130 of arc 128 (i.e., perpendicular to radar aperture 102) and passing through base point 138 and target 108. Construct baseline 104 therefore substantially perpendicularly bisects first partial aperture 120' at a first aperture midpoint 142', and substantially per bisects second partial aperture 120" at a second aperture midpoint 142" (see FIG. 1).

At least one of partial apertures 120 is made up of at least two non-contiguous chord portions 140. In the preferred embodiment, chord 130 (i.e., radar aperture 102) is divided into four, substantially equal and sequential portions 140. First partial aperture 120' is made up of the two contiguous central chord portions 140, and second partial aperture 120" is made up of the two non-contiguous outer chord portions 140.

Data collection path 100 contains arc 128. Radar aperture 102 is chord 130 of arc 128. Lines extending from the junctures of portions 140 substantially parallel to construct baseline 104 will intersect arc 128 (i.e., data collection pat 100) at starting point 132, a first inter-aperture point 144, base point 138, a second inter-aperture point 146, and ending point 134. In task 18 aircraft 122 traverses data collection path 100 (arc 128) from starting point 132 to ending point 134 to transit radar aperture 102 (chord 130). Therefore, aircraft 122 transits a first portion of first partial aperture 120' while traversing data collection path 100 from starting point 132 to first inter-aperture point 144, a first portion of second partial aperture 120" while traversing data collection path 100 from first inter-aperture point 144 to base point 138, a second portion of second partial aperture 120" while traversing data collection path 100 from base point 138 to second inter-aperture point 146, and a second portion of first partial aperture 120' while traversing data collection path 100 from second inter-aperture point 146 to ending point 134.

In parallel tasks 32, partial SAR data 148 is accumulated over each partial aperture 120. The result is first partial SAR data 148' accumulated by task 32' while aircraft 122 transits first partial aperture 120', and second partial SAR data 148" accumulated by task 32" while aircraft 122 transits second partial aperture 120". In the preferred embodiment of FIG. 1, aircraft 122 transits radar aperture 102 as task 16 is executed. Radar aperture 102 is partitioned (task 26) in four substantially equal consecutive portions 140. Therefore, a first half of second partial SAR data 148" is accumulated (task 32") as aircraft 122 transits a first chord portion 140, then a first half of first partial SAR data 148' is accumulated (task 32') as aircraft 122 transits a second chord portion 140, then a second half of first partial SAR data 148' is accumulated (task 32') as aircraft 122 transits a third chord portion 140, and finally a second half of second partial SAR data 148" is accumulated (task 32") as aircraft 122 transits a fourth chord portion 140. SAR data 118, i.e., the data accumulated over the entirety of radar aperture 102, is firs and second partial SAR data 148 taken together.

Those skilled in the art will appreciate that SAR data 116 is contained in raw data 124 (FIG. 2). That is, SAR data 118 is the data collected while aircraft 122 traverses data collection path 100 from starting point 132 to ending point 134, while raw data 124 is at least this data. It will also be appreciated that chord 130, starting and ending points 132 and 134, construct baseline 104, and all components of partial apertures 120 are geometric constructs based upon the relationship of data collection path 100 to target 108. All partitioning and data apportioning related thereto is performed in computer 114, and need not be performed at the time raw data 124 is collected. Data accumulating tasks 32, performed by radar set 112, may be effected independently of geometric relationship defining tasks 22, 24, 26, 28, and 30 without departing from the spirit of the present invention.

A primary task 34 in subroutine 12 establishes vectors 106 for first and second partial apertures 120. A task 36 establishes a vertical plane 110 substantially coincident with construct baseline 104 and in which vectors 106 shall reside. In FIG. 1, vertical plane 110 would ideally be perpendicular to data collection path 100, i.e., perpendicular to the plane of FIG. 1. As this is not practical, vertical plane 110 is depicted as rotated 90° to be flat upon the drawing.

Tasks 38 determine mean points 150 for partial apertures 120. Desirably, aircraft 122 traverses arc 128 from starting point 132 to ending point 134 at a substantially constant speed and accumulates SAR data at substantially equiangular sample intervals (not shown). Aircraft 122 transits first partial aperture 120' while traversing data collection path 100 from first inter-aperture point 144 through base point 138 to second inter-aperture point 146. First partial aperture 120' therefore has a depth along construct baseline 104 from base point 138 to first aperture midpoint 142'. An average of the sample intervals between first inter-aperture point 144 and second inter-aperture point 146 establishes a Lean 152' for first partial aperture 120'. A task 38' determines a mean point 150' of first partial aperture 120' where construct baseline 104 intersects mean 152'.

Similarly, aircraft 122 transits second partial aperture 120" while traversing data collection path 100 from starting point 132 to first inter-aperture point 144 and from second inter-aperture point 146 to ending point 134. Second partial aperture 120" therefore has a depth along construct baseline 104 from first aperture midpoint 142' to second aperture midpoint 142". An average of the sample intervals between starting point 132 and first inter-aperture point 144, and between second inter-aperture point 146 and ending point 134, establishes a mean 152" for second partial aperture 120". A task 38" determines a mean point 150" of second partial aperture 120" where construct baseline 104 intersects mean 152".

Tasks 40 then establish angles 154 for vectors 106 of partial apertures 120. Mean points 150 are projected upward in vertical plane 110 to intersect data collection path 100 at an altitude 156. Task 40' establishes first vector 106' for first partial aperture 120' as the vector from target 108 to the projection of first mean point 150' at altitude 156. Similarly, task 40" establishes second vector 106" for second partial aperture 120" as the vector from target 108 to the projection of second mean point 150" at altitude 156. First and second vectors 106' and 106", in conjunction with construct baseline 104, subtend first and second angles 154' and 154" for first and second partial apertures 120' and 120", respectively. First and second angles 154' and 154" are not equal.

As discussed hereinbefore, data collection path 100 is desirably a substantially circular arc 128 in substantially a horizontal plane. This is not a requirement of the present invention, and those skilled in the art will appreciate that path 100 may be of any desired curvature in any desired plane. If data collection path 100 is not substantially horizontal, altitude 156 may be divided into first altitude 156' being the average altitude of aircraft 122 while transiting first partial aperture 120', and second altitude 156", being the average altitude of aircraft 122 while transiting second partial aperture 120". Task 40' then establishes first vector 106' as the vector from target 108 to the projection of first mean point 150' at first altitude 156'. Similarly, task 40' establishes second vector 106" for second partial aperture 120" as the vector from target 108 to the projection of second mean point 150" at second altitude 156".

Figure 5:
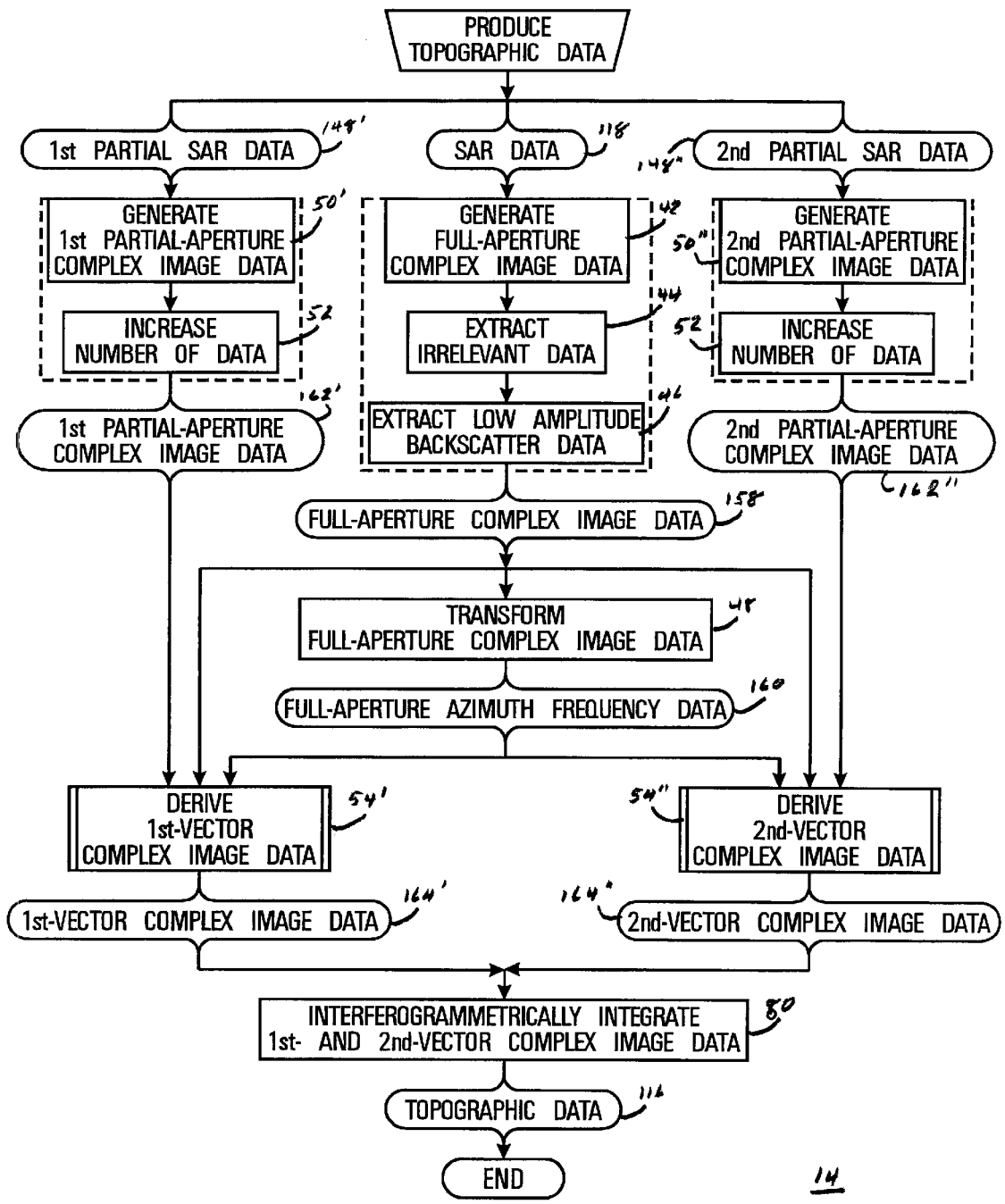
FIG. 5 shows a flowchart depicting a topographic data production subprocess in accordance with a preferred embodiment of the present invention.

FIG. 5 shows a flowchart depicting subprocess 14 to produce topographic data 116 in accordance with a preferred embodiment of the present invention. The following discussion refers to FIGS. 3 and 5.

In topographical data synthesization process 10 (FIG. 3), subprocess 12 to collect SAR data 118 is followed by subprocess 14 to produce topographic data 116 from SAR data 118. Subprocess 14 is entered with SAR data 118, first partial SAR data 148', and second partial SAR data 148". SAR data 118 is a concatenation of the totality of first and second partial SAR data 148' and 148", i.e., SAR data 118 is full-aperture SAR data.

A primary task 42 of subprocess 14 generates full-aperture complex image data 158 from SAR data 118. A task 44 extracts irrelevant data (not shown) and a task 46 extracts low-amplitude backscatter data (not shown) from complex image data. The irrelevant data may include man-made structures deemed irrelevant to the desired topological data 116. The low-amplitude backscatter data may include image areas where topographical data is dominated by system noise.

A task 48 then transforms full-aperture complex image data 158 from the spatial domain to the azimuth frequency domain to obtain full-aperture azimuth frequency data 160. Task 48 is typically effected though the use of the well-known fast Fourier transform function.

Parallel primary tasks 50 generate partial-aperture complex image data 162 from partial SAR data 148. Within each primary task 50, a task 52 increases the number of data in partial aperture image data to the number of data in full aperture image data 158. In effect, partial aperture image data is upsampled to support the resolution of full aperture image data 158. This results in first and second partial-aperture complex image data 162' and 162".

Figure 6:
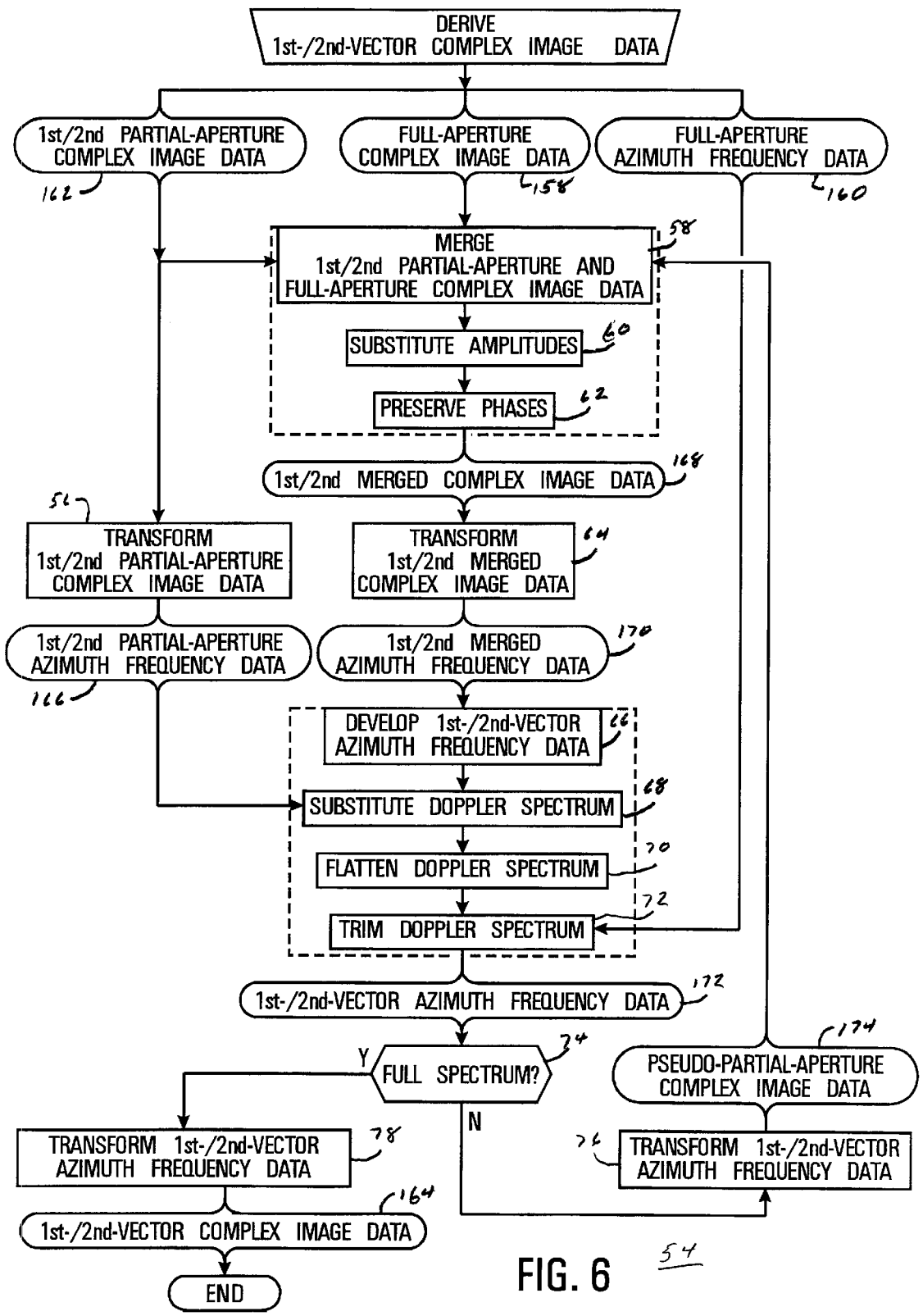
FIG. 6 shows a flowchart depicting a first or second vector complex image data derivation subprocess in accordance with a preferred embodiment of the present invention.

FIG. 6 shows a flowchart depicting a subprocess 54 to derive one of a first or second vector complex image data 164 in accordance with a preferred embodiment of the present invention. The following discussion refers to FIGS. 5 and 6.

Subprocess 14 (FIG. 5) continues with parallel subprocesses 54 to derive vector complex image data 164 from partial-aperture complex image data 162, full-aperture complex image data 158, and full-aperture azimuth frequency data 160. All differentiated tasks and elements within each subprocess 54 are consistent. That is, first subprocess 54' derives first vector complex image data 164' from first partial-aperture complex image data 162' utilizing all "first" differentiated tasks and elements. Similarly, second subprocess 54" derives second vector complex image data 164" from second partial-aperture complex image data 162" utilizing all "second" differentiated tasks and elements.

Subprocess 54 produces vector complex image data 164 from. partial-aperture complex image data 162 in conjunction with full-aperture complex image data 158 and full-aperture azimuth frequency data 160. Within subprocess 54 (FIG. 6), a task 56 transforms partial-aperture complex image data a 162 from the spatial domain to the azimuth frequency domain to produce partial-aperture azimuth frequency data 166. Task 56 is typically effected though the use of the well-known fast Fourier transform function.

A primary task 58 merges partial-aperture complex image data 162 with full-aperture complex image data 158 to produce merged complex image data 168. Each datum in either partial-aperture complex image data 162 or full-aperture complex image data 158 is a complex value having both amplitude and phase. A task 60 substitutes the amplitude of each datum in partial-aperture complex image data 162 for the amplitude of the corresponding datum in full-aperture complex image data 158 while a task 62 preserves the phase of that datum in partial-amplitude complex image data 162. Therefore, each datum of merged complex image data 168 has the amplitude of the corresponding datum of full-aperture complex image data 158 and the phase of the corresponding datum of partial-aperture complex image data 162.

A task 64 then transforms merged complex image data 168 from the spatial domain to the frequency domain to produce merged azimuth frequency data 170. Task 64 is typically effected though the use of the well-known fast Fourier transform function.

A primary task 66 then develops vector azimuth frequency data 172 from partial-aperture azimuth frequency data 166 and merged azimuth frequency data 170. During the task 64 transformation of merged complex image data 163, the Doppler spectrum was expanded due o the information infused during the amplitude overlay of task 60. A task 68 substitutes that portion of the Doppler spectrum present in partial-aperture azimuth frequency data 166, i.e., that was present in the original partial-aperture complex image data 162, for the expanded Doppler spectrum of merged azimuth frequency data 170. A task 70 then flattens the magnitude response of the Doppler spectrum by applying amplitude compensation to areas outside the original data, and a task 72 trims any Doppler spectrum growth outside that of full-aperture azimuth frequency data 160, i.e., that present in full-aperture complex image data 158. The result is vector azimuth frequency data 172.

A query task 74 then determines if the Doppler spectrum of vector azimuth frequency data 172 is full (i.e., extrapolated to the Doppler spectrum of full-aperture frequency data 160). If query task 74 determines that the Doppler spectrum of vector azimuth frequency data 172 is not full, then a task 76 transforms vector azimuth frequency data 172 to the spatial domain to produce pseudo-partial-aperture complex image data 174. Task 76 is typically effected though the use of the well-known inverse fast Fourier transform function. Pseudo-partial-aperture complex image data 174 is then routed back to task 58 to be merged with full-aperture complex image data 158 in lieu of partial-aperture complex image data 162. Tasks 58, 60, 62, 64, 66, 6.8, 70, 72, 74, and 76 are iterated until query task 74 determines that the Doppler spectrum of vector azimuth frequency data 172 is full.

When query task 74 determines that the Doppler spectrum of vector azimuth frequency data 172 is full, a task 78 transforms vector azimuth frequency data 172 to the spatial domain to produce vector complex image data 164, completing subprocess 54. Task 78 is typically effected though the use of the well-known inverse fast Fourier transform function.

In subprocess 14 (FIG. 5), a task 80 interferogrammetrically integrates (i.e., combines) first and second vector complex image data 164' and 164" produced by parallel subroutines 54 to produce topographic data 116, thereby completing subprocess 14 and process 10. Each of first and second vector complex image data 164' and 164" has interferogrammetric properties. Specifically, first and second vector complex image data 164' and 164" contain corresponding data that are substantially identical in amplitude but different in phase. Task 80 may be effected using any of a plurality of well-known SAR topographic processing techniques. Indeed, the interferogrammetric properties of vector complex image data 164 may be demonstrated by producing an interferogram (i.e., a hologram) from first and second vector complex image data 164' and 164". The resultant interferogram, when properly illuminated, will visually demonstrate the topographic (three-dimensional) data inherent in the phase differences.

Those skilled in the art will appreciate that process 10 (FIG. 3) may be augmented and/or modified to obtain improved vector complex image data 164 without departing from the spirit of the present invention. For example, since the present invention utilizes a single-pass, single-antenna technique to collect SAR data 118, a conventional single-pass spatially variant autofocus technique may be used to simultaneously produce lower-accuracy topographic data. This lower-accuracy topographic data may be correlated with vector azimuth frequency data developing primary task 66 as a basis to reduce iterations of vector complex image data deriving subprocess 54 while simultaneously increasing the accuracy of the resultant vector complex image data.

In summary, the present invention teaches a process 10 for synthesizing topographic data 116 from synthetic aperture rada(SAR) data 118. Process 10 collects SAR data 118 in a single pass over an arcuate data collection oath 100 transiting a single radar aperture 102 having a construct baseline 104 to a target 108. Process 10 partitions radar aperture 102 into partial apertures 120 each substantially having construct baseline 104. Process 10 processes partial SAR data 148 collected over each partial aperture 120 into vector complex image data 164 containing interferogrametric properties. Process 10 then interferogrammetrically integrates vector complex image data 164 to produce topographic data 116.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method for synthesizing topographic data of a target, said method comprising:
   a) collecting synthetic aperture radar (SAR) data of said target in only one pass;
   b) generating full-aperture complex image data of said target from said SAR data;
   c) generating first partial-aperture complex image data of said target from a first portion of said SAR data;
   d) generating second partial-aperture complex image data of said target from a second portion of said SAR data;
   e) deriving first vector complex image data of said target in response to said first partial-aperture complex image data and said full-aperture complex image data;
   f) deriving second vector complex image data of said target in response to said second partial-aperture complex image data and said full-aperture complex image data; and
   g) interferogrammetrically integrating said first vector complex image data and said second vector complex image data to produce said topographic data of said target.

2. A method as claimed in claim 1 wherein said collecting activity a) comprises:
   transiting a radar aperture in said one pass over one data collection path, said radar aperture having a construct baseline through said target; and
   accumulating said SAR data over said radar aperture during said one pass.

3. A method as claimed in claim 1 wherein said collecting activity a) comprises:
   transiting a radar aperture in said one pass over one data collection path, said radar aperture having a construct baseline through said target;
   partitioning said radar aperture to form a first partial aperture having substantially said construct baseline, wherein a mean of said first partial aperture establishes a first vector from said target having a first angle;
   partitioning said radar aperture to form a second partial aperture having substantially said construct baseline, wherein a mean of said second partial aperture establishes a second vector from said target having a second angle not equal to said first angle;
   accumulating said first portion of said SAR data over said first partial aperture; and
   accumulating said second portion of said SAR data over said second partial aperture.

4. A method as claimed in claim 3 wherein said transiting activity comprises establishing said construct baseline substantially perpendicular to said radar aperture and passing through said target.

5. A method as claimed in claim 3 wherein said collecting activity a) additionally comprises:

establishing a vector of said first partial aperture where said mean of said first partial aperture intersect said construct baseline at an altitude of said data collection path; and establishing a vector of said second partial aperture where said mean of said second partial aperture intersect said construct baseline at an altitude of said data collection path.

6. A method as claimed in claim 1 wherein said generating activity b) comprises:

extracting irrelevant data from said full-aperture complex image data; and extracting low amplitude backscatter data from said full-aperture complex image data.

7. A method as claimed in claim 1 wherein said generating activity c) comprises increasing a number of data in said first partial-aperture complex image data to substantially match a number of data in said full-aperture complex image data.

8. A method for synthesizing topographic data of a target, said method comprising:

a) collecting synthetic aperture radar (SAR) data of said target;

b) generating full-aperture complex image data of said target from said SAR data;

c) generating first partial-aperture complex image data of said target from a first portion of said SAR data;

d) generating second partial-aperture complex image data of said target from a second portion of said SAR data;

e) transforming said first partial-aperture complex image data into partial-aperture azimuth frequency data;

f) merging said first partial-aperture complex image data and said full-aperture complex image data to produce merged complex image data;

g) transforming said merged complex image data into merged azimuth frequency data;

h) developing vector azimuth frequency data in response to said merged azimuth frequency data and said partial-aperture azimuth frequency data;

i) transforming said vector azimuth frequency data to produce said first vector complex image data;

j) deriving second vector complex image data of said target in response to said second partial-aperture complex image data and said full-aperture complex image data; and k) interferogrammetrically integrating said first vector complex image data and said second vector complex image data to produce said topographic data of said target.

9. A method as claimed in claim 8 wherein said merging activity f) comprises:

substituting an amplitude of each of said first partial-aperture complex image data with an amplitude of a corresponding one of said full-aperture complex image data; and preserving a phase of each of said first partial-aperture complex image data during said substituting activity.

10. A method as claimed in claim 8 wherein:

said method additionally comprises transforming said full-aperture complex image data into full-aperture azimuth frequency data; and said developing activity h) comprises:

substituting a Doppler spectrum from said partial-aperture azimuth frequency data for a Doppler spectrum in said merged frequency data;

flattening said substituted Doppler spectrum in a growth area of said merged frequency data; and trimming portions of said substituted Doppler spectrum, extending beyond a Doppler spectrum from said full-aperture azimuth frequency data.

11. A method as claimed in claim 10 additionally comprising iterating said deriving activity e) if said substituted Doppler spectrum does not extend to said Doppler spectrum from said full-aperture azimuth frequency data.

12. A method for synthesizing topographic data of a target, said method comprising:

transiting a radar aperture in only one pass over one data collection path;

partitioning said radar aperture to form first and second partial apertures;

accumulating first and second portions of synthetic aperture radar (SAR) data over said first and second partial apertures, respectively;

generating first and second partial-aperture complex image data of said target from said first and second portions of said SAR data, respectively;

generating full-aperture complex image data of said target from said first and second portions of said SAR data;

deriving first and second vector complex image data of said target in response to said full-aperture complex image data and said first and second partial-aperture complex image data; and interferogrammetrically integrating said first-and second vector complex image data to produce said topographic data of said target.

13. A method for synthesizing topographic data of a target, said method comprising:

traversing substantially an arc in a data collection path;

establishing a radar aperture as substantially a chord of said arc;

partitioning said radar aperture to form first and second partial apertures;

accumulating first and second portions of synthetic aperture-radar (SAR) data over said first and second partial apertures, respectively;

generating first and second partial-aperture complex image data of said target from said first and second portions of said SAR data, respectively;

generating full-aperture complex image data of said target from said first and second portions of said SAR data;

deriving first and second vector complex image data of said target in response to said full-aperture complex image data and said first and second partial-aperture complex image data; and interferogrammetrically integrating said first and second vector complex image data to produce said topographic data of said target.

14. A method as claimed in claim 13 wherein said partitioning activity comprises:

dividing said chord into three sequential portions;

defining an inner one of said portions as being said first partial aperture; and defining outer ones of said portions as together being said second partial aperture.

15. A method for synthesizing topographic data of said target, said method comprising:

traversing a data collection path as substantially a plurality of consecutive chords of an arc substantially symmetrical about a base point closer to said target than any other point upon said arc;

establishing a radar aperture as substantially one of said chords;

substantially perpendicularly bisecting said radar aperture with a construct baseline extending through said base point and said target;

partitioning said radar aperture to form first and second partial apertures;

accumulating first and second portions of synthetic aperture radar (SAR) data over said first and second partial apertures, respectively;

generating first and second partial-aperture complex image data of said target from said first and second portions of said SAR data, respectively;

generating full-aperture complex image data of said target from said first and second portions of said SAR data;

deriving first and second vector complex image data of said target in response to said full-aperture complex image data and said first and second partial-aperture complex image data; and interferogrammetrically integrating said first and second vector complex image data to produce said topographic data of said target.

16. A method for synthesizing topographic data of a target, said method comprising:

traversing a data collection path as substantially an arc substantially symmetrical about a base point closer to said target than any other point upon said arc;

establishing a radar aperture as substantially a chord of said arc;

substantially perpendicularly bisecting said radar aperture with a construct baseline extending through said base point and said target;

partitioning said radar aperture to form first and second partial apertures;

accumulating first and second portions of synthetic aperture radar (SAR) data over said first and second partial apertures, respectively;

generating first and second partial-aperture complex image data of said target from said first and second portions of said SAR data, respectively;

generating full-aperture complex image data of said target from said first and second portions of said SAR data;

deriving first and second vector complex image data of said target in response to said full-aperture complex image data and said first and second partial-aperture complex image data; and interferogrammetrically integrating said first and second vector complex image data to produce said topographic data of said target.

17. A method as claimed in claim 16 wherein said partitioning activity additionally comprises:

dividing said radar aperture into four sequential and substantially equal portions thereof;

defining inner ones of said portions to form said first partial aperture; and defining outer ones of said portions to form said second partial aperture.

18. A method as claimed in claim 17 wherein said partitioning activity additionally comprises:

determining a first mean point substantially vertically coincident with said construct baseline at a mean of said first partial aperture, wherein said first mean point establishes a first vector having a first angle from said target; and determining a second mean point substantially vertically coincident with said construct baseline at a mean of said second partial aperture, wherein said second mean point establishes a second vector having a second angle from said target.

19. A method as claimed in claim 18 wherein said accumulating activity additionally comprises:

establishing a vector of said first partial aperture where said mean of said first partial aperture intersects said construct baseline and establishes said first angle with said target; and establishing a vector of said second partial aperture where said mean of said first partial aperture intersects said construct baseline and establishes said second angle with said target.

20. A method for synthesizing topographic data of a target, said method comprising:

transiting a radar aperture in a data collection path;

partitioning said radar aperture to form first and second partial apertures;

accumulating first and second portions of synthetic aperture radar (SAR) data over said first and second partial apertures, respectively;

generating first and second partial-aperture complex image data of said target from said first and second portions of said SAR data, respectively;

generating full-aperture complex image data of said target from said first and second portions of said SAR data;

transforming said first and second partial-aperture complex image data into first and second partial-aperture frequency data, respectively;

merging said first and second partial-aperture complex image data and said full-aperture complex image data to produce first and second merged complex image data, respectively;

transforming said first and second merged complex image data into first and second merged azimuth frequency data, respectively;

developing first and second vector azimuth frequency data in response to said first and second merged azimuth frequency data and said first and second partial-aperture frequency data, respectively;

transforming said first and second vector azimuth frequency data into first and second vector complex image data, respectively; and interferogrammetrically integrating said first and second vector complex image data to produce said topographic data of said target.

21. A method for synthesizing topographic data of a target, said method comprising:

transiting, in only one pass, a radar aperture partitioned into first and second partial apertures;

accumulating first and second portions of synthetic aperture radar (SAR) data over said first and second partial apertures, respectively, during said one pass;

producing first and second vector complex image data of said target in response to said first and second portions of said SAR data; and interferogrammetrically integrating said first and second vector complex image data to produce said topographic data.

22. A method for synthesizing topographic data of a target, said method comprising:

traversing substantially a circular arc in substantially a horizontal plane;

establishing a radar aperture as substantially a chord of said arc;

dividing said chord into four sequential and substantially equal portions thereof;

defining inner ones of said portions to form a first partial aperture;

defining outer ones of said portions to form a second partial aperture;

accumulating first and second portions of synthetic aperture radar (SAR) data over said first and second partial apertures, respectively;

producing first and second vector complex image data of said target in response to said first and second portions of said SAR data; and interferogrammetrically integrating said first and second vector complex image data to produce said topographic data.

23. A method as claimed in claim 21 wherein said producing activity comprises:

generating full-aperture complex image data of said target from said first and second portions of said SAR data;

generating first and second partial-aperture complex image data of said target from said first and second portions of said SAR data, respectively;

deriving first and second vector complex image data of said target in response to said full-aperture complex image data and said first and second partial-aperture complex image data; and interferogrammetrically integrating said first and second vector complex image data to produce said topographic data of said target.

24. A method for synthesizing topographic data of a target, said method comprising:

collecting synthetic aperture radar (SAR) data of said target over a portion of a substantially circular arc, wherein a chord of said arc establishes a radar aperture having a substantially perpendicular construct baseline through said target;

partitioning said radar aperture into four sequential and substantially equal portions thereof, wherein inner ones of said portions form a first partial aperture having substantially said construct baseline, and outer ones of said portions form a second partial aperture having substantially said construct baseline;

determining first and second mean points substantially vertically coincident with said construct baseline at means of said first and second partial apertures, respectively;

establishing first and second vectors with said target at said first and second mean points, respectively;

accumulating first and second portions of said SAR data over said first and second partial apertures, respectively; and producing said topographic data in response to said first and second portions of said SAR data.

* * * * *

UNITED STATES PATENT AND TRADEMARK OFFICE
CERTIFICATE OF CORRECTION

PATENT NO.    : 6,573,856 B1
DATED         : June 3, 2003
INVENTOR(S)   : Kenneth Fell Obenshain It is certified that error appears in the above-identified patent and that said Letters Patent is hereby corrected as shown below:

<u>Title page,</u>
Item [57], ABSTRACT,
Line 3, replace "wherein a.chord", with -- wherein a chord --.

<u>Column 2,</u>
Line 31, replace "parabolic chase shift", with -- parabolic phase shift --.

<u>Column 3,</u>
Line 1, replace "Invention", with -- invention --.
Lines 42 and 43, replace "plan view of data" with -- plan view of a data --.

<u>Column 4,</u>
Line 2, replace "from,a", with -- from a --.
Line 11, replace "and,FIG.", with -- and FIG. --.
Line 27, replace "version c a", with -- version of a --.
Lines 61 and 62, replace "in the art appreciate", with -- in the art will appreciate --.
Line 63, replace "parabolic, etc .,", with -- parabolic, etc., --.

<u>Column 5,</u>
Lines 15 and 16, replace "baseline 109 bisects", with -- baseline 104 bisects --.
Line 18, replace "Partitions", with -- partitions --.
Line 24, replace "an(a parallel", with -- and a parallel --.
Line 25, replace "two cuter portions", with -- two outer portions --.
Line 44, replace "substantially per bisects", with -- substantially perpendicularly bisects --.
Line 57, replace "collection pat 100", with -- collection path 100 --.

<u>Column 6,</u>
Lines 25 and 26, replace "is firs and", with -- is first and --.
Line 27, replace "data 116" with -- data 118 --.
Line 62, replace "establishes a Lean", with -- establishes a mean --.

<u>Column 7,</u>
Lines 37 and 38, replace "task 40' establishes", with -- task 40" establishes --.

<u>Column 8,</u>
Line 27, replace "from. partial-aperture", with -- from partial-aperture --.
Lines 59 and 60, replace "data 163, the", with -- data 168, the --.
Line 60, replace "due o the", with -- due to the --.

UNITED STATES PATENT AND TRADEMARK OFFICE
CERTIFICATE OF CORRECTION

PATENT NO.   : 6,573,856 B1
DATED        : June 3, 2003
INVENTOR(S)  : Kenneth Fell Obenshain It is certified that error appears in the above-identified patent and that said Letters Patent is hereby corrected as shown below:

Column 9,
Line 18, replace "58, 60, 62, 64, 66, 6.8, 70, 72, 74" with
-- 58, 60, 62, 64, 66, 68, 70, 72, 74 --.

Column 12,
Line 4, replace "spectrum, extending", with -- spectrum extending --.

Signed and Sealed this

Sixteenth Day of September, 2003

JAMES E. ROGAN
*Director of the United States Patent and Trademark Office*